DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED JUNE 3, 1975

935 O.G. 9

T935,002

LIQUEFIED NATURAL GAS OXYGEN SEPARATION WATER DESALINATION AND ELECTRICAL GENERATION SYSTEM

Joseph Seliber, 313 Hibbard Road, Wilmette, Ill. 60091

Continuation of abandoned application Ser. No. 154,015, June 17, 1971. This application Jan. 31, 1974, Ser. No. 438,300

Int. Cl. B01d *3/10*

U.S. Cl. 203—11

1 Sheet Drawing. 8 Pages Specification

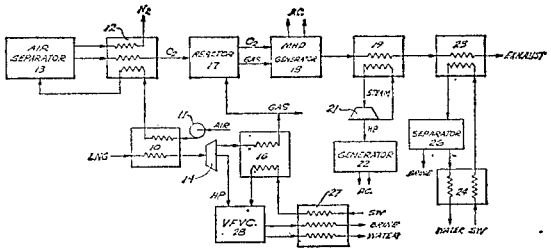

A combined system and method using liquefied natural gas for generating electricity and recovering potable water from saline water is provided. The liquefied natural gas cools air that is separated to produce oxygen that is combined with a portion of the vaporized natural gas for producing electricity preferably with a magnetohydrodynamic (MHD) generator. Additional refrigeration and kinetic energy gained from gas expansion are employed for vacuum freezing vapor compression desalination. Heat from the MHD generator may generate steam for producing additional electricity, and also heat water for vaporization desalination. Preferably a nuclear reactor is used for preheating oxygen and natural gas before reaction in the MHD generator.

ERRATA

In the notices of Defensive Publications appearing on pages 9–12 in the Official Gazette of June 3, 1975, the names of the assignees were omitted and should be added as indicated below:

T935,001. E. I. du Pont de Nemours and Company, Wilmington, Del.
T935,002. Pacific Lighting Service Co., Los Angeles, Calif.
T935,003. International Business Machines Corporation, Armonk, N.Y.
T935,004. International Business Machines Corporation, Armonk, N.Y.
T935,005. International Business Machines Corporation, Armonk, N.Y.
T935,006. E. I. du Pont de Nemours and Company, Wilmington, Del.

In the notices of Defensive Publications appearing on pages 7 and 8 in the Official Gazette of July 1, 1975, the following names of assignees were omitted and should be added:

T936,001. E. I. du Pont de Nemours and Company, Wilmington, Del.
T936,002. E. I. du Pont de Nemours and Company, Wilmington, Del.
T936,005. Du Pont of Canada Limited, Quebec, Canada June 3, 1975 J. SELIBER T935,002
LIQUEFIED NATURAL GAS OXYGEN SEPARATION WATER DESALINATION AND ELECTRICAL GENERATION SYSTEM
Original Filed June 17, 1971
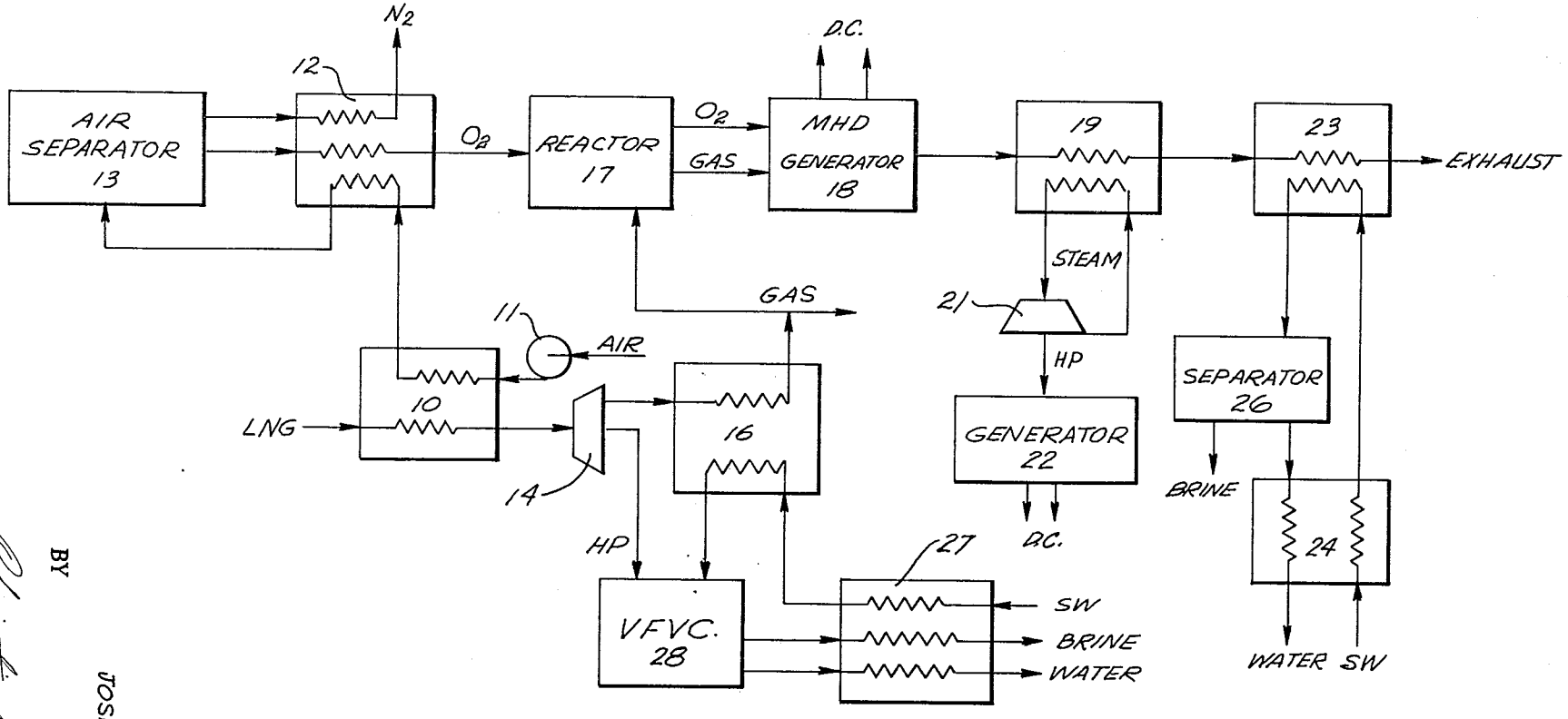
INVENTOR.
JOSEPH SELIBER
BY
Christie, Parker & Hale
ATTORNEYS